United States Patent
Hodge

(10) Patent No.: US 9,922,366 B1
(45) Date of Patent: Mar. 20, 2018

(54) SYSTEMS AND METHODS FOR PRODUCT ORDERING AND DELIVERY FOR INMATES

(71) Applicant: **Global Tel*Link Corporation**, Reston, VA (US)

(72) Inventor: Stephen Lee Hodge, Aubry, TX (US)

(73) Assignee: **Global Tel*Link Corporation**, Reston, VA (US)

(*) Notice: Subject to any disclaimer, the term of this patent is extended or adjusted under 35 U.S.C. 154(b) by 0 days.

(21) Appl. No.: 15/652,963

(22) Filed: Jul. 18, 2017

Related U.S. Application Data

(62) Division of application No. 15/492,822, filed on Apr. 20, 2017.

(51) Int. Cl.
| | |
|---|---|
| *G06Q 30/00* | (2012.01) |
| *G06Q 30/06* | (2012.01) |
| *G06Q 10/08* | (2012.01) |
| *G06Q 50/26* | (2012.01) |
| *G06K 7/10* | (2006.01) |

(52) U.S. Cl.
CPC ....... *G06Q 30/0635* (2013.01); *G06Q 10/087* (2013.01); *G06K 7/10237* (2013.01); *G06Q 50/26* (2013.01)

(58) Field of Classification Search
CPC .......... G06Q 30/0635; G06Q 30/0615; G06Q 10/087; G06Q 10/08355; G06Q 50/26; G06K 7/10237
See application file for complete search history.

(56) References Cited

U.S. PATENT DOCUMENTS 6,807,530 B1 * 10/2004 Shub ..................... G06Q 20/12
705/26.42

OTHER PUBLICATIONS

Androulaki, Elli, and Steven Bellovin. "Apod: Anonymous physical object delivery." Privacy Enhancing Technologies. Springer Berlin /Heidelberg, 2009. (Year: 2009).*

Blau, R., "New York State prisons to fight contraband smuggling by banning packages for inmates," New York Daily News, Mar. 28, 2017; 3 pages.

* cited by examiner

*Primary Examiner* — Matthew E Zimmerman
(74) *Attorney, Agent, or Firm* — Sterne, Kessler & Goldstein & Fox P.L.L.C.

(57) ABSTRACT

Disclosed herein is a system that includes an order processing subsystem and a delivery processing subsystem comprising at least one database and one or more processors. The one or more processors of the delivery processing subsystem is configured to receive a request for a user to access the delivery processing subsystem and a scanning device, authenticate the user by verifying the request with user credentials stored in the at least one database, provide the user with access to the delivery processing subsystem and the scanning device, receive scanned data from the scanning device, retrieve package data regarding a package for an inmate based on the scanned data from the scanning device, and generate, based on the package data, a route in the correctional facility for delivery of the package to the inmate in the correctional facility, wherein the route does not include an identity of the inmate.

16 Claims, 6 Drawing Sheets

SYSTEMS AND METHODS FOR PRODUCT ORDERING AND DELIVERY FOR INMATES

CROSS-REFERENCE TO RELATED APPLICATIONS

This application is a divisional of U.S. patent application Ser. No. 15/492,822 filed on Apr. 20, 2017, which is incorporated by reference herein in its entirety.

BACKGROUND

Field

The disclosure relates to systems and methods that provide product ordering and delivery services to individuals in a controlled environment.

Background

In a controlled environment such as a correctional facility, inmates have limited opportunities to interact with or receive items from the outside world. In some cases, inmates may have opportunities to purchase products, such as hygiene products, snacks, or the like, from a commissary within a correctional facility. While a commissary may be useful, inmates may be restricted in their purchases by the limited selection of products typically available at the commissary. Inmates may also receive packages shipped to the correctional facility from their family members and friends; however, these packages may be utilized to smuggle contraband, explosives, or harmful agents into the conventional facility. Inmates may ultimately be limited in the types of items which they may order or receive resulting from a lack of product availability at commissaries and a need for additional security in examining packages sent to correctional facilities. Accordingly, there may be a need for new technologies, systems, and methods that allow correctional facilities to provide safe and confidential product ordering and delivery services to inmates.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
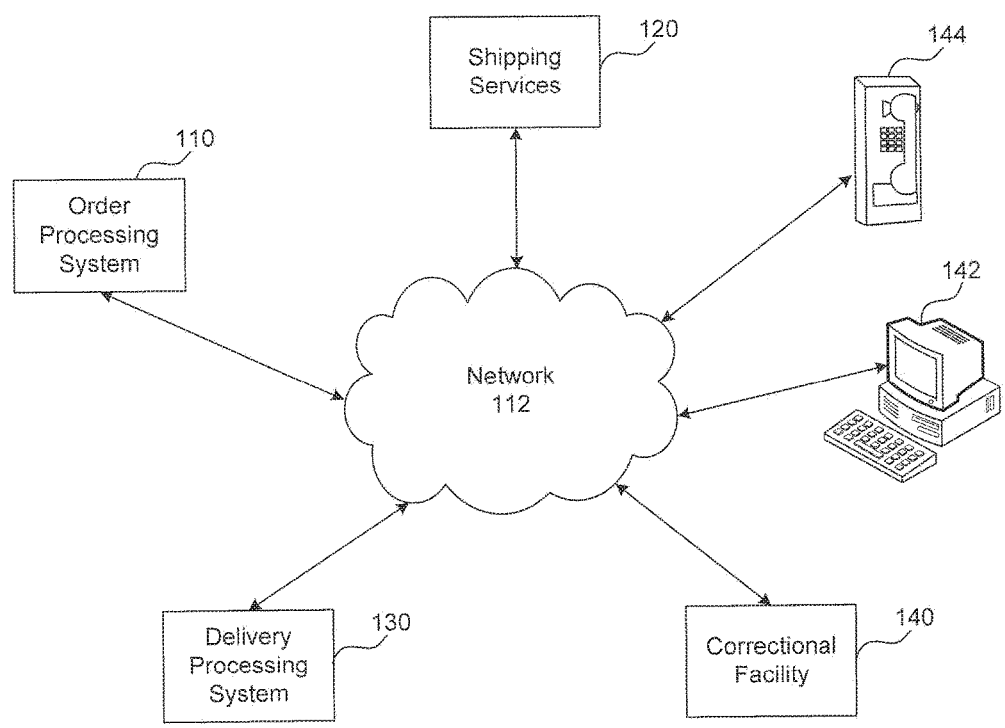
FIG. 1 illustrates a block diagram of a product ordering and delivery system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, or hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Product Ordering and Delivery System

FIG. 1 illustrates a block diagram of a product ordering and delivery system 100, according to embodiments of the present disclosure. Product ordering and delivery system 100 includes an order processing system 110 configured to provide product ordering services to inmates at correctional facility 140 by communicating with and/or transmitting packaging information to shipping services 120 and delivery processing system 130 via network 112. In an embodiment, order processing system 110 comprises any number of servers, computers, and/or devices for managing and processing orders placed by inmates at correctional facility 140. In some embodiments, order processing system 110 is located outside the correctional facility 140, such as in a secure facility that is exterior to a jurisdiction of the correctional facility 140.

Correctional facility 140 comprises a controlled environment, such as a prison for a plurality of inmates. Although FIG. 1 illustrates only one correctional facility 140, it is understood that there can be a plurality of correctional facilities 140 in the product ordering and delivery system 100. For example, order processing system 110 comprises any number of servers and/or devices associated with a centralized facility that processes orders and packages for distribution to inmates in a plurality of correctional facilities 140 in various jurisdictions.

In some embodiments, packages addressed to inmates that are sent by friends, family members, and/or loved ones of the inmates are rerouted or delivered to a centralized facility where the order processing system 110 is located. Prior to delivery to inmates at one or more correctional facilities 140, the contents of each package sent by friends, family members, and/or loved ones of inmates are inspected for contraband items by personnel at the centralized facility, such as by at least one of a visual inspection, weight inspection, X-ray inspection, or the like. In some embodiments, friends, family members, and/or loved ones of inmates also send letters and/or photos to inmates. In such cases, letters and/or photos are also inspected, such as by scanning the letters or photos, performing optical character recognition (OCR) on the scanned letters or images, applying a content filter check on the scanned letters or images, and analyzing the scanned letters or images for keywords, phrases, or images that are restricted by the jurisdiction. After inspection, the contents of each package, letter, and/or photo are recorded by personnel and submitted to the order processing system 110 (e.g., stored in one or more databases in order processing system 110). The contents of the packages are repackaged and delivered to inmates at the correctional facility 140, whereas scanned documents (e.g., letters and/or photos) are emailed or transmitted to one or more devices associated with each inmate.

In some embodiments, inmates within the correctional facility 140 have access to one or more devices, such as a computer station 142 or telephone 144. Computer station 142 and/or telephone 144 communicates with order processing system 110 via network 112, which includes at least one of local area network (LAN), wireless area network (WAN), the Internet, Public Switched Telephone Network (PSTN), or the like. Although only one computer station 142 and one telephone 144 is shown in FIG. 1, it is understood that there can be any number of components 142 and 144 in the product ordering and delivery system 100.

In some embodiments, computer station 142 comprises a desktop computer, a tablet computer, a laptop computer, a computer terminal, a wireless device, or the like. For example, computer station 142 is located locally within the correctional facility 140, such as in a designated area or room of the controlled environment. In additional or alternative embodiments, computer station 142 is a remote computing device, which inmates use to access one or more websites hosted by servers in order processing system 110. In some embodiments, inmates utilize the computer station 142 to access product ordering and delivery services provided to the correctional facility 140. For example, an inmate utilizes a web browser on the computer station 142 to log on to his or her product ordering account on a website and connect to a web server and/or order processing server in the order processing system 110. By accessing the website on the computer station 142, the inmate selects one or more products and/or merchandise from an online catalog of products available for purchase and delivery to the correctional facility 140. In some cases, the online catalog of products available for purchase and delivery is predetermined by a jurisdiction of the correctional facility 140, based on one or more restrictions and/or jurisdictional requirements that are specific to a particular facility. For example, certain jurisdictions might not allow particular items (e.g., magazines, cameras, mobile devices, portable digital media players, or the like) into facilities, whereas other jurisdictions allow one or more of these items in their facilities.

In some embodiments, telephone 144 comprises a payphone, landline phone, or the like, that is located locally within the correctional facility 140, such as in a designated area or room of the controlled environment. For example, inmates have access to the telephone 144 to place orders for one or more products by calling a sales representative or account representative to purchase products available through the order processing system 110. In an embodiment, inmates receive a catalog comprising information on a plurality of products that are available for purchase and delivery to the correctional facility 140. Based on the catalog, inmates choose certain products to order and call one or more representatives to place the order via the telephone 144. In some embodiments, inmates place an order for one or more products by filling out a form (e.g., a paper form or online form) and submitting the form to an individual at the correctional facility or mailing the form to a sales representative or company.

In some cases, an inmate might not be given privileges to access computer station 142 and/or telephone 144. For example, different correctional facilities 140 in various jurisdictions have stricter regulations than others, which prevent inmates from having access to communication devices, such as computer station 142 and/or telephone 144.

Additionally or alternatively, inmates have certain privileges taken away as a result of violations or infractions during their time at the correctional facility 140. For such cases, an individual in an administrative position places orders on behalf of one or more inmates in the correctional facility 140. For example, an individual comprises an authorized manager of the correctional facility 140 or any individual who is authorized to take orders from the inmates. An individual with authorization places an order to the order processing system 110 using computer station 142 and/or telephone 144 on behalf of an inmate.

Furthermore, friends, family members, and/or loved ones of inmates also place orders to purchase one or more products to be sent to the correctional facility 140. In some embodiments, such individuals who are external to the correctional facility 140 utilize computer station 142 or telephone 144 to submit an order for one or more products to be sent to an inmate. For example, computer station 142 includes a personal computer, laptop, notebook, tablet, or the like, of a friend, family member, and/or loved one of an inmate and is utilized outside of the correctional facility 140. Telephone 144 includes a personal phone, mobile device, or smartphone of a friend, family member, and/or loved one of an inmate, and is also utilized outside of the correctional facility 140. By using computer station 142 and/or telephone 144, individuals associated with inmates are able to order products for inmates online or over the phone.

In some embodiments, friends, family members, and/or loved ones of inmates are authorized to access a website associated with the order processing system 110 using computer station 142 and/or telephone 144. For example, an inmate provides information (e.g., names, relationship with inmate, and other details) regarding his friends, family members, and/or loved ones to the order processing system 110 and/or administration at the correctional facility 140. Individuals who have been specified as friends, family members, and/or loved ones of the inmate are given authorization (e.g., credentials, username, password, etc.) to access a website associated with the order processing system 110 and order products that are delivered to the inmate at the correctional facility 140. By providing authorization to specific individuals associated with the inmate, other individuals are prevented from accessing services provided by the order processing system 110 and ordering and sending unwanted items to the inmate. In some embodiments, an administrator of the order processing system 110 is able to make certain exceptions for friends and/or family members of inmates who have not been specified by the inmate, such that these friends and/or family members are able to access the website associated with the order processing system 110 and place orders.

After an order has been placed (e.g., by the inmate or by a loved one of the inmate), the order processing system 110 receives the order information (e.g., via computer station 142 or telephone 144) and processes the order by applying one or more restrictions to the order, managing the inmate's account, processing payment, generating an order number, assigning tags, generating labels, and managing packaging of the order for the inmate. In some embodiments, the order processing system 110 communicates with shipping services 120 to provide instructions for shipping packages containing ordered products to inmates at various correctional facilities 140. In some embodiments, shipping services 120 represents one or more servers, computers, and/or devices accessible to a shipping company or service, such as a courier delivery service, postal service, package delivery company, or the like. The order processing system 110 transmits data regarding packages (e.g., items to be shipped, shipping address, method of shipping, tag and label information for packages, and the like) to one or more servers, computers, and/or devices of shipping services 120.

In some embodiments, an inmate's order information and inmate identity information is kept anonymous and/or confidential from personnel at the order processing system 110, as well as personnel at the shipping services 120, by aggregating and/or encoding the order information and inmate identity information into a form that is only readily understood by the order processing system 110 and delivery processing system 130, such as through RFID or QR codes, as will be discussed in further detail below. For example, personnel at the shipping services 120 fulfill the orders for the order processing system 110 without knowing which inmate's order they are packaging and/or shipping in order to prevent any tampering with the packages to be shipped. By maintaining confidentiality of the inmate's identity and keeping order information anonymous throughout the ordering and delivery processes, the product ordering and delivery system 100 allows correctional facilities to ensure security and prevent contraband items being delivered to inmates at the correctional facilities. In some embodiments, the shipping services 120 receives packages to be shipped in shipping containers, along with the data regarding packages, and the shipping services 120 ships the packages to one or more correctional facilities 140. In some embodiments, information regarding delivery of each package at each correctional facility 140 is managed by delivery processing system 130.

Delivery processing system 130 comprises any number of servers, computers, and or devices configured to manage and process the delivery of packages received from shipping services 120. In some embodiments, delivery processing system 130 is located within the correctional facility 140 and is accessed by individuals who are authorized employees of the correctional facility 140. Delivery processing system 130 communicates with order processing system 110 to receive and/or transmit information regarding order information, package information, inmate profile information, and the like.

Order Processing System

Figure 2:
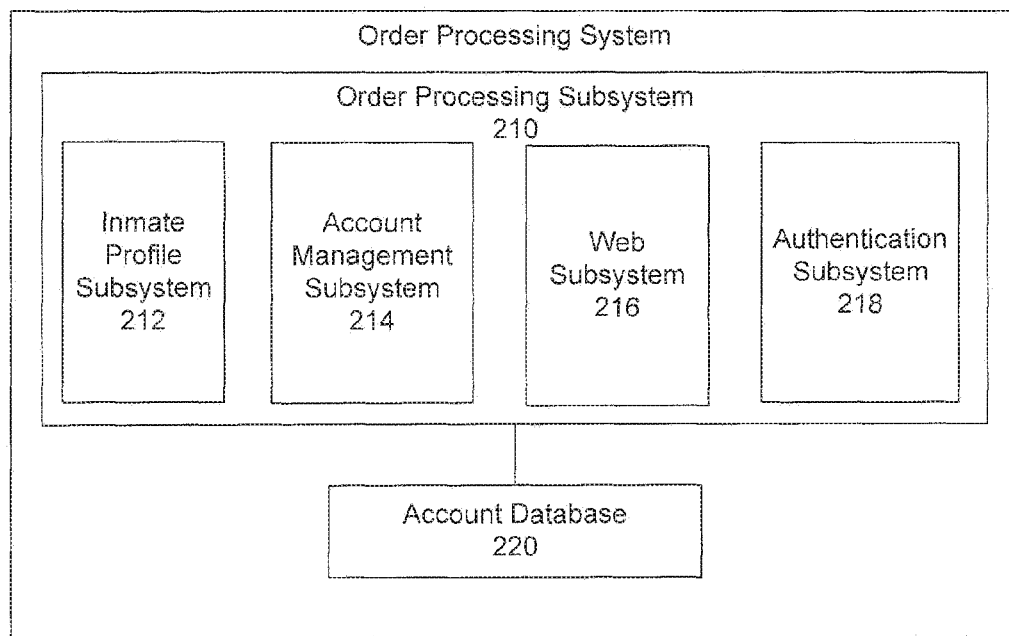
FIG. 2 illustrates a block diagram of an order processing system of the product ordering and delivery system, according to embodiments of the present disclosure.

FIG. 2 illustrates a block diagram of the order processing system 200, according to embodiments of the present disclosure. Order processing system 200 represents an exemplary embodiment of order processing system 110 in FIG. 1. Order processing system 200 includes at least an order processing subsystem 210 and an account database 220, as shown in FIG. 2. In some embodiments, order processing subsystem 210 include one or more processors, computers, or servers identified as subsystems and is constructed as individual physical hardware devices, or as virtual devices, such as a virtual server.

The number of order processing subsystems 210 can be scaled to match the number of correctional facilities and jurisdictions desired to be supported by order processing system 200. In some embodiments, order processing subsystem 210 functions as the primary logic processing center in order processing system 200. Order processing subsystem 210 manages and facilitates overall communication between subsystems of order processing system 200 and devices and/or systems external to order processing system 210, such as shipping services 120, delivery processing system 130, computer station 142, telephone 144, or other devices associated with correctional facility 140. Order processing subsystem 210 includes inmate profile subsystem 212, account management subsystem 214, web subsystem 216, and authentication subsystem 218.

Inmate profile subsystem 212 obtains and stores profile information on inmates who are registered to order products via product ordering and delivery system 100. In some embodiments, inmate profile subsystem 212 obtains information related to the inmates from one or more of (a) a jail management system (JMS) or an offender management system (OMS) operated by the jurisdiction of the correctional facility, (b) public database containing information on the inmates, or (c) a questionnaire provided by a web page, a personal approved number (PAN) list, or booking information. In some embodiments, information obtained by inmate profile subsystem 212 includes personal information such as previous residences or correctional facilities, authorized contacts, family members, languages, special needs, medication requirements, or the like, in which the personal information can be utilized for authenticating an inmate's identity and/or determining one or more restrictions for ordering for an inmate. Inmate profile subsystem 212 collects and stores inmate information in an inmate profile for each inmate in a plurality of correctional facilities.

Additionally, inmate profile subsystem 212 collects and stores information regarding a plurality of restrictions for each inmate, in which the plurality of restrictions are defined in the inmate profile for each inmate. In some embodiments, the plurality of restrictions for each inmate includes at least one of one or more product restrictions, quantity limits, spending limits, weight limits, order frequency limits, and the like. For example, some inmates are restricted from ordering certain types of products (e.g., sharp items, rope, or the like), whereas other inmates are allowed to order such types of products. In other examples, there are one or more restrictions on the number of products and/or the weight of products an inmate can order, the amount of funds an inmate can spend on ordering products, how often an inmate can order certain products, and the like. Thus, a plurality of restrictions for product ordering is predetermined for each inmate by an administrator of order processing system 200 or an administrator of a correctional facility.

In some embodiments, inmate profile subsystem 212 is configured to determine a plurality of restrictions for each inmate by parsing profile information of the inmate and determining restrictions based on the inmate's booking information and/or information provided by a jail management system (JMS) or an offender management system (OMS) operated by the jurisdiction of the correctional facility. In other embodiments, inmate profile subsystem 212 determines and stores the plurality of restrictions as whitelist data and blacklist data. For example, whitelist data includes specific names, quantities, weights, or the like, of products that have been approved for an inmate to order, whereas blacklist data includes specific names, quantities, weights, or the like, of products that are restricted or off-limits for ordering by an inmate. In some embodiments, inmate profile subsystem 212 stores inmate profiles and restriction information internally or in account database 220.

In additional embodiments, order processing subsystem 210 communicates with inmate profile subsystem 212 to access the plurality of restrictions for each inmate and applies the restrictions to an order of the inmate. For example, order processing subsystem 210 identifies one or more products in the order of the inmate, determines whether at least one product in the order of the inmate violates a restriction of the plurality of restrictions, and removes the at least one product from the order of the inmate in response to determining that at least one product violates the restriction of the plurality of restrictions. In some embodiments, order processing subsystem 210 determines whether at least one product in the order of the inmate violates a restriction by determining whether at least one product exceeds at least one predefined threshold for the plurality of restrictions.

Account management subsystem 214 obtains and manages account information for inmates ordering products via product ordering and delivery system 100. In some embodiments, account management subsystem 214 manages the transfer of funds from an inmate's account for ordering one or more products made available by order processing system 200. For example, an inmate places an order for one or more products through order processing system 200. After the order has been processed (e.g., such as by applying one or more restrictions to the order), account management subsystem 214 generates a number (e.g., a unique identification number comprising alphanumeric characters) associated with the inmate and the order and transfers funds from the inmate's account to an account associated with a correctional facility, company or organization offering the one or more products for purchase via order processing system 200. In some cases, the company or organization offering the one or more products for purchase comprises a vendor or company that has been approved and/or partnered with a correctional facility or jurisdiction to supply a plurality of products for purchase through order processing system 200. In other cases, the correctional facility offers the one or more products for purchase to inmates, and the account management subsystem 214 transfers funds from the inmate's account to one or more accounts associated with the correctional facility.

In some embodiments, account management subsystem 214 generates an order number for each order prior to the transfer of funds for the order from an inmate's account to an account associated with the correctional facility. After generating the order number for the order and transferring funds, the account management subsystem 214 assigns a tag to the order number. The tag is then placed on or inside a package comprising the one or more ordered products. In some embodiments, the tag includes an RFID tag, barcode, quick response (QR) code, or the like. In other embodiments, account management subsystem 214 generates one or more labels comprising the tag to be affixed to a package comprising the order. For example, one or more labels are generated, in which a RFID tag, barcode, or quick response (QR) code is printed on the one or more labels. Additionally, account management subsystem 214 generates instructions that are transmitted to a shipping company (e.g., shipping services 120), in which the instructions indicate for a package containing an order to be shipped with the assigned tag and/or one or more labels, without providing an order number for the order. For example, the package containing the order is shipped without the order number and without any information discernable to a human so as to conceal the identity of the inmate and contents of the package. By providing the shipping company with only the assigned tag information and product information, the order processing system 200 maintains the confidentiality of order information for inmates and prevents tampering of packages to include contraband items prior to delivery to correctional facilities.

In additional embodiments, account management subsystem 214 manages account information for a plurality of inmates, such as one or more of inmate names, inmate identification numbers, correctional facility names and locations, account numbers (e.g., for a financial institution), credit card numbers, debit card numbers, order history, order number information, packaging information, or the like. In some embodiments, account management subsystem 214 compiles one or more reports for an administrator of order processing system 200, in which the one or more reports comprise information regarding products ordered by the inmate and/or products ordered by the inmate's family members, friends, and/or loved ones.

Web subsystem 216 runs web server software such as Apache and/or Microsoft Internet Information Server and/or an interactive voice response (IVR) server software. In some embodiments, the primary function of web subsystem 216 is to operate as a frontend and/or backend server in hosting one or more websites, from which inmates, authorized individuals, friends, family members, and/or loved ones of inmates place orders for one or more products to be delivered to inmates. For example, web subsystem 216 provides users utilizing a computing device (e.g., computer station 142) with a user interface that allows users to select one or more products from a catalog of products for delivery to a correctional facility. In some embodiments, web subsystem 216 receives data regarding an order for one or more products for an inmate, and web subsystem 216 communicates with at least one of order processing subsystem 210, inmate profile subsystem 212, and account management subsystem 214 to apply one or more restrictions to the order, manage the inmate's account, and process the order.

Authentication subsystem 218 collects and stores identity data and/or user credentials of inmates and authorized individuals (e.g., employees of correctional facility 140) that are authorized to access order processing system 200. In some embodiments, identity data includes at least one of a username and password data, challenge questions, challenge answers, biometric data, device data such as make and model of a communication device, and/or location data. For example, biometric data includes one or more of a finger print, a hand print, a voice sample, an iris or retinal sample, an image of the user (2D or 3D), a hand geometry, a signature identification, an infrared camera identification, or any other biometric as deemed appropriate. The challenge question form of identity data comprises a series of challenge questions, or a single challenge question such as the last four digits of a user's social security number, mother's maiden name, and the like. In some embodiments, authentication subsystem 218 is utilized to ensure security of order information of inmates by performing identity verifications to authenticate identities of users, including logon verifications, such as username and password verifications, biometric verification, response to challenge questions, device verification, and/or location verification.

In some embodiments, authentication subsystem 218 utilizes identity data to authenticate a user attempting to access a website providing a catalog of products for ordering and delivery to a correctional facility. For example, a user, such as an inmate, friend, family member, or loved one of an inmate, or an authorized individual at the correctional facility is provided with credentials, such as a username, password, and/or identification number, in order to access a website associated with the order processing system 200 and order products to be delivered to the correctional facility. Upon receiving a request from a user to access a website or product catalog, authentication subsystem 218 verifies user information provided in the request with stored user credentials (e.g., collected and stored in account database 220) in order to determine whether or not to provide the user with access to the website or catalog. After the user has been authenticated, authentication subsystem 218 communicates with web subsystem 216 to provide the user with access to the website offering the catalog of products for ordering and delivery to the correctional facility.

In further embodiments, authentication subsystem 218 communicates with delivery processing system 130 to authenticate users attempting to access order information for packages delivered to a correctional facility. In some cases, users, such as individuals who are authorized employees of the correctional facility 140, are allowed to access order information, package information, inmate profile information, and like after being authenticated by authentication subsystem 218. For example, authentication subsystem 218 receives, from the delivery processing system 230, a request for a user to access the delivery processing system 130. Authentication subsystem 218 authenticates a user by verifying the user's credentials (e.g., username and password) with stored user credentials (e.g., stored in account database 220 or in database in delivery processing system 130). In response to authenticating the user, authentication subsystem 218 communicates with delivery processing system 130 to provide the user with access to the delivery processing system 130. In some embodiments, authentication subsystem can be present in other locations, such as in a central call management server that facilitates communication with the order processing system 200 or on site in a site server or other on-site authentication system. For example, additional authentication processes can take place earlier in the ordering process, such as in the central call management server, on site at a correctional facility in a site server, or in another authentication system.

Account database 220 comprises any number of databases and/or servers, and stores and organizes data in one or more relational databases. Account database 220 runs a database management system, such as MYSQL™, to provide an example. In some embodiments, account database 220 includes organized data, such as respective identity data, authentication data, inmate profile data, jurisdictional requirements and rules, restriction data, and settings that are indexed and linked to allow access to data for order processing subsystem 210, inmate profile subsystem 212, account management subsystem 214, web subsystem 216, and/or authentication subsystem 218.

In additional embodiments, order processing system 200 also manages and processes information for packages, letters, and/or photos addressed to inmates that are sent by friends, family members, and/or loved ones of the inmates. For example, packages, letters, and/or photos sent by friends, family members, and/or loved ones of the inmates are received at a centralized facility where the order processing system 200 is located, and information regarding the contents of each package, letter, and/or photo is obtained and managed by the order processing subsystem 210 and/or account management subsystem 214. In some embodiments, the order processing subsystem 210 and/or account management subsystem 214 is configured to scan letters or photos, perform optical character recognition (OCR) on the scanned letters or images, apply a content filter check on the scanned letters or images, and analyze the scanned letters or images for keywords, phrases, or images that are restricted by the jurisdiction. The order processing subsystem 210 and/or account management subsystem 214 also stores information regarding the contents of each package, letter, and/or photo in a database, such as account database 220. in some embodiments, packages are repackaged at the centralized facility where the order processing system 200 is located and delivered to inmates at the correctional facility 140, whereas scanned documents (e.g., letters and/or photos)

are emailed or transmitted by order processing subsystem 210 to one or more devices (e.g., computer station 142) associated with each inmate.

Delivery Processing System

Figure 3:
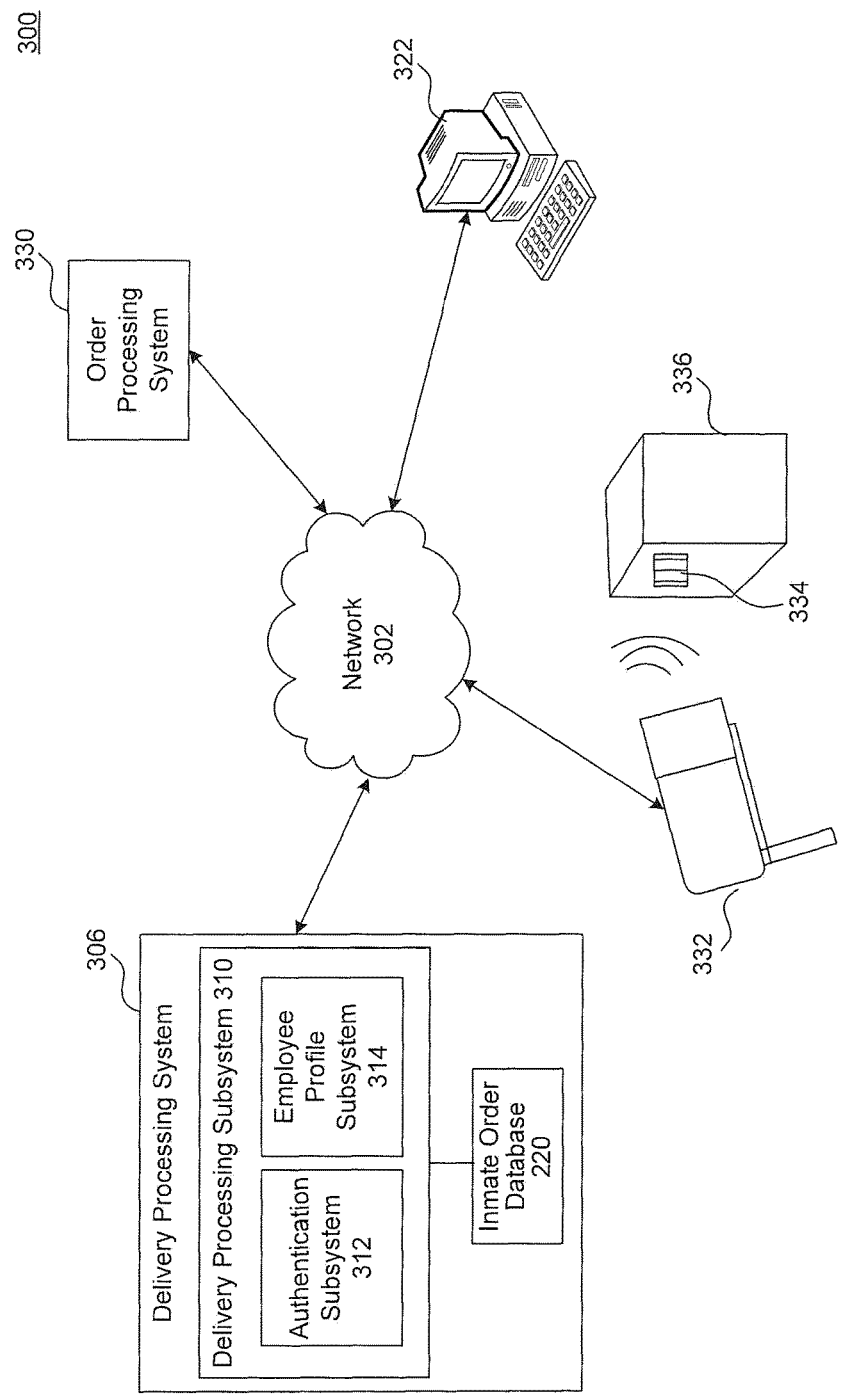
FIG. 3 illustrates a block diagram of a delivery processing system in the product ordering and delivery system, according to embodiments of the present disclosure.

FIG. 3 illustrates a block diagram of the delivery processing subsystem 306 in the product ordering and delivery system 300, according to embodiments of the present disclosure. Delivery processing system 300 represents an exemplary embodiment delivery processing system 130 in FIG. 1, and product ordering and delivery system 300 is the same as or at least similar to the product ordering and delivery system 100 described above with respect to FIG. 1.

As shown in FIG. 3, delivery processing system 306 communicates with order processing system 330, computer station 322, and a tag reader 332 via network 302. Order processing system 330 can be the same as or at least similar to order processing system 110 and order processing system 200 in FIG. 1 and FIG. 2, respectively. Computer station 322 and network 302 can be the same as or at least similar to computer station 142 and network 112 in FIG. 1, respectively.

In some embodiments, delivery processing system 306, computer station 322, and tag reader 332 are located within a correctional facility, such as in correctional facility 140. Delivery processing system 306 includes at least a delivery processing subsystem 310 and an inmate order database 320, as shown in FIG. 3. Delivery processing subsystem 310 includes one or more processors, computers, or servers identified as subsystems and are constructed as individual physical hardware devices, or as virtual devices, such as a virtual server. The number of delivery processing subsystems 310 can be scaled to match the number of correctional facilities and jurisdictions desired to be supported by delivery processing system 306. In some embodiments, delivery processing subsystem 310 functions as the primary logic processing center in delivery processing system 306. Delivery processing subsystem 310 manages and facilitates communications between subsystems of delivery processing system 306, order processing system 330, computer station 332, and devices and/or systems internal or external to a correctional facility. Delivery processing subsystem 310 includes authentication subsystem 312 and employee profile subsystem 314.

Authentication subsystem 312 is utilized to authenticate users requesting to access the delivery processing system 306. For example, a user, such as an employee of a correctional facility, uses computer station 322 to request access to one or more servers, computers, and/or devices associated with delivery processing system 306. The user enters his or her user credentials (e.g., username, identification number, or the like) and password using computer station 322, and authentication subsystem 312 authenticates the user's credentials and password by verifying the information with previously stored user credentials (e.g., stored in employee profile subsystem 314). In particular, authentication subsystem 312 ensures security of inmate profile information and order information by performing identify verification to authenticate identities of users, including logon verifications, such as username and password verifications, biometric verification, response to challenge questions, device verification, and/or location verification.

Employee profile subsystem 314 obtains and stores profile information, identity data, and/or user credentials for authorized individuals (e.g., employees of the correctional facility) that are authorized to access delivery processing system 306. For example, employee profile subsystem 314 stores identity data, such as at least one of username and password data, challenge questions, challenge answers, biometric data, device data such as make and model of a communication device, and/or location data. Biometric data includes one or more of a finger print, a hand print, a voice sample, an iris or retinal sample, an image of the user (2D or 3D), a hand geometry, a signature identification, an infrared camera identification, or any other biometric as deemed appropriate. The challenge question form of identity data comprises a series of challenge questions, or a single challenge question such as the last four digits of a user's social security number, mother's maiden name, and the like. Authentication subsystem 312 communicates with employee profile subsystem 314 to retrieve user credentials stored in the employee profile subsystem and verify user requests to access the delivery processing system 306 with the retrieved user credentials. Upon authenticating an authorized user based on user credentials, authentication subsystem 312 provides the authorized user with access to the delivery processing system 306, as well as access to a reader 332.

In some embodiments, the reader 332 comprises a scanning device, such as an RFID reader, barcode reader, quick response (QR) code reader, or the like. After a user has been authenticated by the authentication subsystem 312, the delivery processing subsystem 310 provides the user with access to the reader 332 and access to the delivery processing system 306 via computer station 322. For example, the user is able to scan packages, such as package 336, using the reader 332. Although only one package 336 is shown in FIG. 3, package 336 represents a plurality of packages delivered to a correctional facility by a shipping service. In some embodiments, each package 336 comprises a shipping enclosure with a clear or transparent container that holds the ordered merchandise inside. Each package 336 comprises a tag 334, which is added to the package 336 by personnel at a centralized facility where the order processing system 330 is located. In some embodiments, the tag 334 comprises an RFID tag, barcode, quick response (QR) code, or the like, and each package 336 comprises a unique tag 334 that is different from tags 334 on other packages 336. In some embodiments, the tag 334 is printed on one or more labels, and the one or more labels are affixed to the package 336. After the tag 334 has been added to a package 336, a shipping service or company delivers the package 336 to the correctional facility based on information (e.g., items, to be shipped, shipping address, method of shipping, tag information, and the like) provided by the order processing system 330 to the shipping service or company. In some embodiments, the correctional facility receives the package 336 comprising tag 334, and an employee or authorized user uses computer station 322 to provide his or her user credentials to the delivery processing subsystem 310 in order to authenticate and gain access to delivery processing system 306 and reader 332. In other words, a user is unable to access the delivery processing system 306 and/or reader 332 in order to scan in packages 336 without authentication of the user.

Once the user has been provided access, the user utilizes the reader 332 to read or scan the tag 334 on the package 336. In some embodiments, the reader 332 comprises a mobile device, such as a smartphone with a camera, which can be used to scan or photograph the tag 334 on the package 336. The reader 332 receives data from the tag 334 (e.g., a barcode, a uniform resource locator (URL), or the like), and the data from the tag 334 is transmitted to or accessed by the user's computer station 322. In an embodiment, the information encoded into the barcode or QR code is pre-encoded so that a conventional QR scanner does not readily produce the information. In some cases, each correctional facility has a predetermined encoding/decoding algorithm which runs on the scanning software of the computer station 322 to decode the pre-encoded information. The computer station 322 transmits the decoded data from the tag 334 to the delivery processing subsystem 310, and the delivery processing subsystem 310 communicates with the order processing system 330 to retrieve data regarding the package 336 associated with the tag 334. For example, a tag 334 on each package 336 corresponds to an order number for an order by a particular inmate, and the order processing system 330 utilizes the order number to retrieve and transmit data regarding the order number, contents of the package 336, inmate name, and the like to the delivery processing system 306. The user at computer station 322 accesses the data regarding the order number, contents of the package 336, inmate name, and the like, and verifies the contents of the package 336 with the data received from the order processing system 330. After the contents of the package 336 have been verified with the data received from the order processing system 330, the package 336 is delivered to corresponding inmate in the correctional facility.

In additional embodiments, the delivery processing subsystem 310 maintains and keeps track of which packages 336 have been delivered by a shipping service or company to the correctional facility, which packages 336 have had contents verified, which packages 336 have been delivered to inmates, and the like. In some embodiments, delivery processing subsystem 306 manages this information in one or more databases, such as inmate order database 320. Inmate order database 320 comprises any number of databases and/or servers, and stores and organizes data in one or more relational databases. Inmate order database 320 runs a database management system, such as MYSQL™, to provide an example. Inmate order database 320 includes organized data, such as inmate identity data, inmate order data, contents of packages for each inmate, and the like, and settings that are indexed and linked to allow access to data for delivery processing subsystem 310, order processing system 330, and/or computer station 322. In some embodiments, inmate order database 320 obtains and maintains information received from order processing system 330 regarding order numbers, package contents, inmate names, and the like.

In some embodiments, order processing system 330 and delivery processing system 306 are implemented collectively as a standalone system that operates as a product ordering and delivery system 300. In other embodiments, order processing system 330 and/or delivery processing system 306 are included in a central call management server, or as separate system(s) from the central call management server. In other embodiments, order processing system 330 and/or delivery processing system 306 are located on site at a correctional facility.

In some embodiments, authorized employees of the correctional facility are given access to deliver packages to inmates only in certain zones or areas of the correctional facility. For example, the correctional facility is divided into different zones or areas, in which each zone or area corresponds to at least one of an inmate's sentencing, the severity of an inmate's offense, or characteristics of an inmate. A plurality of inmates are located in different zones or areas of the correctional facility, and only certain personnel are able to deliver packages to specific zones or areas in the correctional facility, whereas other personnel do not have access to these specific zones or areas in the correctional facility. The correctional facility assigns different employees to each zone in a plurality of zones in the correctional facility, in which the employees are only able to deliver packages to inmates in their assigned zones. In some embodiments, the authentication subsystem 312 of the delivery processing system 306 authenticates an employee requesting to access information through computer 322 by determining whether or not the employee has been given access or privileges to access information regarding delivery of packages to a particular zone of the correctional facility.

If the employee has been given access or privileges to access information regarding delivery of packages to a particular zone of the correctional facility, then the authentication subsystem 312 of the delivery processing system 306 verifies the employee's credentials and provides the employee with access to the delivery processing subsystem 310 and reader 332 in order to scan packages that are to be delivered in the employee's assigned zone. If the employee has not been given access or privileges to access information regarding delivery of packages to a particular zone, then the employee is not provided with access to the delivery processing subsystem 310 and reader 332 for scanning packages. In some embodiments, the employee is able to scan any package, but the authentication subsystem 312 determines that the package is to be delivered to a zone that is not assigned to the employee based on data received from the reader 332. In such cases, the authentication subsystem 312 provides the employee with a notification (e.g., displayed through computer 322) indicating that the scanned package is not within the employee's assigned zone. The authentication subsystem 312 ultimately prevents an employee from being able to access order information (e.g., inmate identity, products ordered, or the like) and/or package information for packages that are assigned to one or more zones that differ from the zone to which the employee is assigned.

In some embodiments, a first employee utilizes a reader to scan a plurality of packages to sort the plurality of packages into different zones, in which each package is assigned to a corresponding zone. Once the packages have been sorted into the different zones, a second employee (e.g., who has been assigned to deliver packages in a particular zone) logs onto the delivery processing subsystem 310 and authenticates through the authentication subsystem 312 to determine who the recipient of each package is (e.g., inmates in the particular zone) and where in the particular zone each packages should be delivered. The second employee can then deliver each package to inmates in his or her assigned zone in the correctional facility.

In further embodiments, the employee who is delivering the packages is not provided with the identities of the inmates receiving the packages. For example, after a plurality of packages have been scanned into the delivery processing system 306, the delivery processing subsystem 310 retrieves data regarding each package from the order processing system 330 and generates a map comprising a route within the correctional facility of one or more stops or locations for where each package is to be delivered. In an embodiment, the delivery processing subsystem 310 accesses one or more databases (e.g., inmate order database 320, account database 220, and/or database(s) in inmate profile subsystem 212) to identify specific locations of where each inmate is located in the correctional facility (e.g., cell numbers and locations of each cell) and generates a map and route comprising directions to the specific locations of the inmates who have received packages. In some cases, the map and route do not reveal identity information for which inmates are receiving packages, but the generated map only shows which route the employee should take within the correctional facility to deliver each package. In some cases, the map does not contain information of which specific cells within the correctional facility packages should be delivered to (e.g., cell number information, inmate names, etc.). Instead, the map provides turn by turn instructions for navigating different zones, floors, and/or hallways of the prison to reach various cells of inmates for package delivery.

System Operation

Operations of providing product ordering, order processing, and delivery services to inmates in a correctional facility 140 through product ordering and delivery system 100 will be described with respect to FIGS. 4 and 5. Although the physical devices and components that form the system have largely already been described, additional details regarding their more nuanced operation will be described below with respect to FIGS. 1-3. While FIGS. 4 and 5 contain methods of operation of order processing and product delivery for product ordering and delivery system 100, the operations are not limited to the order described below, and various operations can be performed in a different order. Further, two or more operations of each method can be performed simultaneously with each other.

Figure 4:
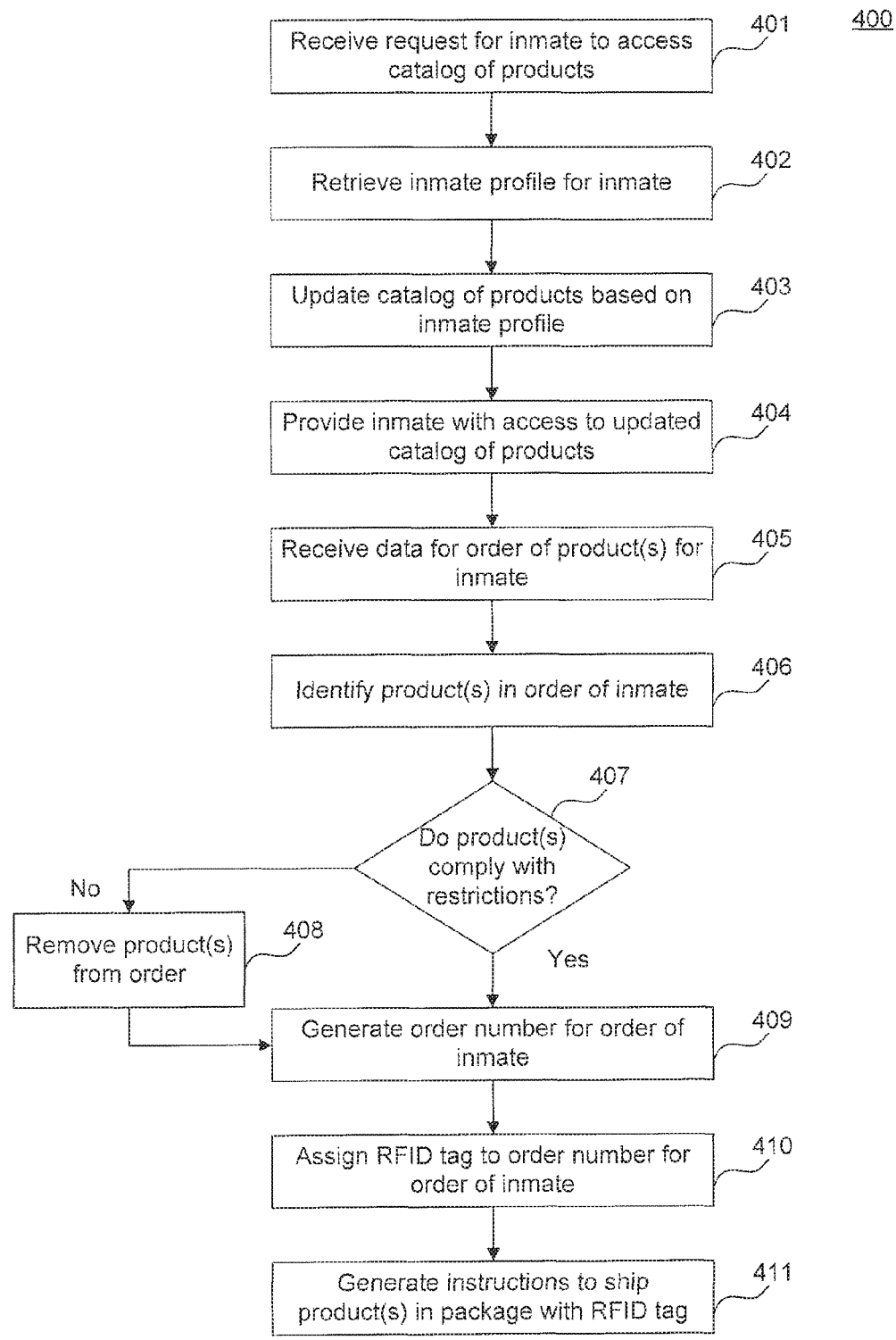
FIG. 4 illustrates a flowchart diagram of a method for providing product ordering services to an inmate, according to embodiments of the present disclosure.

FIG. 4 illustrates a flowchart diagram of a method 400 of providing product ordering services to an inmate, via an order processing system, such as order processing system 200 of FIG. 2, according to embodiments of the present disclosure. The steps of method 400 are performed by subsystems of order processing system 200, such as order processing subsystem 210, inmate profile subsystem 212, account management subsystem 214, web subsystem 216, and/or authentication subsystem 218. Method 400 of FIG. 4 begins with step 401 of receiving a request for an inmate to access a catalog of products. For example, the order processing subsystem 210 receives a request associated with a user from computer station 142 via web subsystem 216, in response to the user utilizing computer station 142 to log on to a website hosted by the web subsystem 216. In some embodiments, the user is an inmate, an authorized individual at the correctional facility (e.g., an individual authorized to place orders on behalf of inmates), or a family member, friend, or loved one of the inmate. The website offers a catalog of products for ordering and delivery to inmates at a correctional facility, in which the products have been approved by the correctional facility or by the jurisdiction.

In response to receiving the request from the user, at step 402, the order processing subsystem retrieves an inmate profile for the inmate. For example, the order processing subsystem 210 accesses inmate profile subsystem 212 and/or account database 220 to retrieve an inmate profile corresponding to the inmate. In some embodiments, the inmate profile indicates various products that the inmate might not be allowed to order (e.g., blacklisted products), as well as a set of products that the inmate is allowed to order (e.g., whitelisted products). At step 403, the order processing subsystem updates a catalog of products based on the inmate profile. For example, the order processing subsystem 210 updates the catalog of products to remove the various products that the inmate might not be allowed to order. In other words, an updated catalog of products includes the set of products that the inmate is allowed to order, without the various products that the inmate is not allowed to order.

At step 404, the order processing subsystem provides the inmate with access to the updated catalog of products. For example, the order processing subsystem 210 communicates with the web subsystem 216 to provide the updated catalog of products, and the web subsystem 216 presents the updated catalog of products to the user at computer station 142 through a user interface of the website hosted by one or more servers of the web subsystem 216. At step 405, the order processing subsystem receives data for an order of one or more products for an inmate. For example, the web subsystem 216 receives data regarding an order for one or more products for an inmate through the website, in which the inmate, authorized individual, family member, friend, and/or loved one of the inmate utilizes computer station 142 to place the order through the website. In other embodiments, the order processing subsystem 210 receives data regarding the order, in which the order is placed by the inmate, authorized individual, family member, friend, and/or loved one of the inmate through telephone 144.

At step 406, the order processing subsystem identifies the one or more products in the order. For example, the order processing subsystem 210 identifies at least one of the types of products in the order, the number of products in the order, product weights, product costs, total costs of products in the order, and the like. At step 407, the order processing subsystem determines whether the one or more products in the order comply with restrictions. For example, the order processing subsystem 210 utilizes the inmate profile (e.g., retrieved from the inmate profile subsystem 212 and/or account database 220) in step 402 to identify a plurality of restrictions on product ordering for the inmate. In some embodiments, the plurality of restrictions is defined in the inmate profile, and the plurality of restrictions includes at least one of one or more product restrictions, quantity limits, spending limits, weight limits, order frequency limits, and the like.

In some embodiments, the order processing subsystem 210 identifies compliance and applies the restrictions to the order for the inmate by determining whether at least one product in the order of the inmate violates a restriction of the plurality of restrictions. If one or more products in the order do not comply with at least one restriction the plurality of restrictions, then method 400 in this example proceeds to step 408. At step 408, the order processing subsystem removes one or more products from the order for the inmate. For example, the order processing subsystem 210 removes the one or more products that did not comply with at least one restriction from the order for the inmate. After the one or more products are removed from the order, then method 400 in this example proceeds to step 409.

If the one or more products in the order comply with the plurality of restrictions, then method 400 in this example proceeds to step 409. At step 409, the order processing subsystem generates an order number for the order of the inmate. For example, the account management subsystem 214 in the order processing subsystem 210 generates a unique number, such as an order number, for the order of the inmate which is used to identify the inmate's order. In some embodiments, after generating the order number, the account management subsystem 214 also transfers funds from the inmate's account to an account associated with a correctional facility, company or organization offering the one or more products for purchase via order processing system 200. At step 410, the order processing subsystem assigns an RFID tag to the order number for the order of the inmate. For example, the account management subsystem 214 in the order processing subsystem 210 assigns an RFID tag (e.g., tag 334) to the order number to be placed on or in a package (e.g., package 336) with the one or more products for the inmate's order. In some embodiments, the tag comprises an RFID tag, barcode, quick response (QR) code, or the like. In some embodiments, the account management subsystem 214 assigns a tag to the order by encoding order information and inmate identity information into the tag, such that the information is only readily understood by the order processing system and/or the delivery processing system by a predetermined encoding/decoding algorithm. In other words, the tag generated by the account management subsystem 214 does not contain any information discernable to a human so as to conceal the identity of the inmate and contents of the package At step 411, the order processing subsystem generates instructions to ship the one or more products in the package with the RFID tag. For example, the account management subsystem 214 in the order processing subsystem 210 generates instructions to ship the one or more products in the package (e.g., package 336) with the RFID tag (e.g., tag 334). In some embodiments, the generated instructions exclude the order number and inmate information (e.g., inmate name and identity information) and only include information regarding the products to be packaged and the RFID tag information. After generating the instructions, the order processing subsystem 210 transmits the generated instructions to a shipping company (e.g., shipping services 120). In other embodiments, the order processing subsystem 210 prints out the generated instructions as a packing label or a shipping order form which is transmitted or mailed to the shipping company or shipping personnel. In some embodiments, a packing label with encoded information comprising the order information and inmate information is then affixed to a package containing the products by the shipping company or shipping personnel. In other embodiments, the order of the inmate is packaged and shipped to the correctional facility in a package without any information discernable to a human so as to conceal the identity of the inmate and contents of the package.

Figure 5:
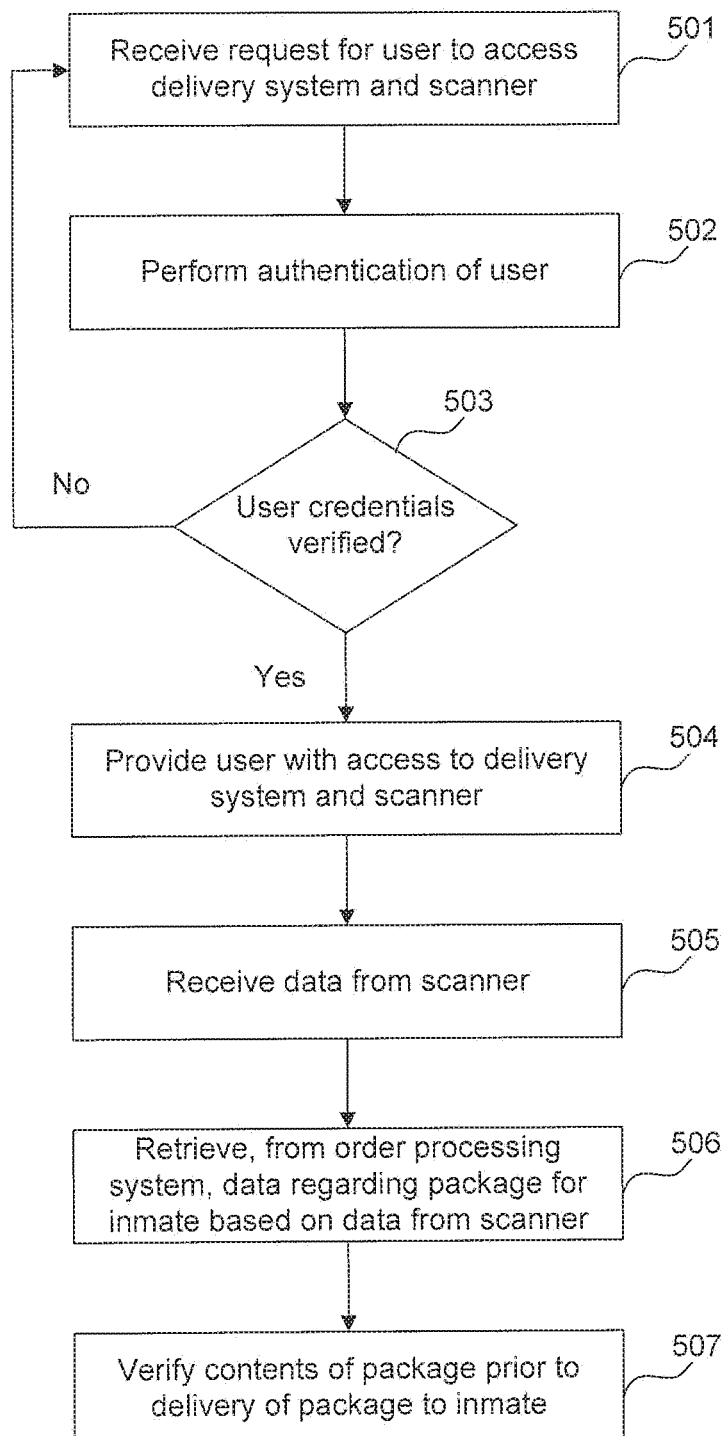
FIG. 5 illustrates a flowchart diagram of a method for providing order processing and delivery services to an inmate, according to embodiments of the present disclosure.

FIG. 5 illustrates a flowchart diagram of a method 500 of providing order processing and delivery services to an inmate via a delivery processing system, such as delivery processing system 306 of FIG. 3, according to embodiments of the present disclosure. The steps of method 500 are performed by subsystems of delivery processing system 306, such as delivery processing subsystem 310, authentication subsystem 312, and/or employee profile subsystem 314. Method 500 of FIG. 5 of begins with step 501 of receiving a request for a user to access a delivery system and scanner. For example, the delivery processing subsystem 310 receives a request from computer station 322 for a user to access delivery processing system 306 and a scanner, such as reader 332. In some embodiments, the user is an employee of the correctional facility who may or may not be authorized to access the delivery processing system 306, and the request includes the user's credentials (e.g., username, identification number, password, or the like).

At step 502, the delivery processing subsystem performs authentication of the user. For example, the authentication subsystem 312 in the delivery processing subsystem 310 authenticates the user requesting access to the delivery processing system 306 by verifying the user credentials from the request. At step 503, the delivery processing subsystem determines whether the user credentials have been verified. For example, the authentication subsystem 312 in the delivery processing subsystem 310 verifies the credentials with stored user credentials in the employee profile subsystem 314, and determines whether the credentials match. If the user credentials are not verified, then method 500 in this example proceeds to step 501, where the user resubmits his or her user credentials in a subsequent request for accessing the delivery processing system 306 and reader 332. If the user credentials are verified, then method 500 in this example proceeds to step 504. At step 504, the delivery processing subsystem provides the user with access to the delivery processing system and scanner. For example, the authentication subsystem 312 in the delivery processing subsystem 310 provides the user at computer station 322 with access to the delivery processing system 306 and reader 332.

At step 505, the delivery processing subsystem receives data from the scanner. For example, the delivery processing subsystem 310 receives data from the reader 332, which is generated by the user scanning a tag 334 on package 336 with the reader 332. In some embodiments, the reader 332 receives data from the tag 334, and the data from the tag 334 is transmitted to or accessed by the user's computer station 322. The computer station 322 transmits the data from the tag 334 to the delivery processing subsystem 310. At step 506, the delivery processing subsystem retrieves, from the order processing system, data regarding a package for an inmate based on data from the scanner. For example, the delivery processing subsystem 310 communicates with the order processing system 330 to retrieve data regarding the package 336 associated with the tag 334. The data regarding the package includes at least one of the order number, contents of the package 336, inmate name, and the like. At step 507, the delivery processing subsystem verifies contents of the package prior to delivery of the package to the inmate. For example, the delivery processing subsystem 310 verifies that the contents of the package 336 match with the data regarding the package 336, which is retrieved from the order processing system 330. In some embodiments, the user at computer station 322 accesses the data regarding the order number, contents of the package 336, inmate name, and the like, checks the contents of the package 336 with the data received from the order processing system 330, and updates information regarding inmate orders and package deliveries in the inmate order database 320 in the delivery processing system 306. The package 336 is then delivered to the corresponding inmate by personnel in the correctional facility after the package contents have been verified.

In additional embodiments, the delivery processing subsystem 310 generates a route in the correctional facility for delivery of the package to the inmate in the correctional facility, in which the route does not include an identity of the inmate. The route provides turn by turn instructions for navigating different zones, floors, and/or hallways of the prison to reach various cells of inmates for package delivery. By utilizing the generated route, personnel can deliver one or more packages to inmates in the correctional facility without knowledge of inmate identities in order to preserve anonymity of the order processing and delivery processes and prevent delivery of contraband to inmates in the correctional facility.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 6:
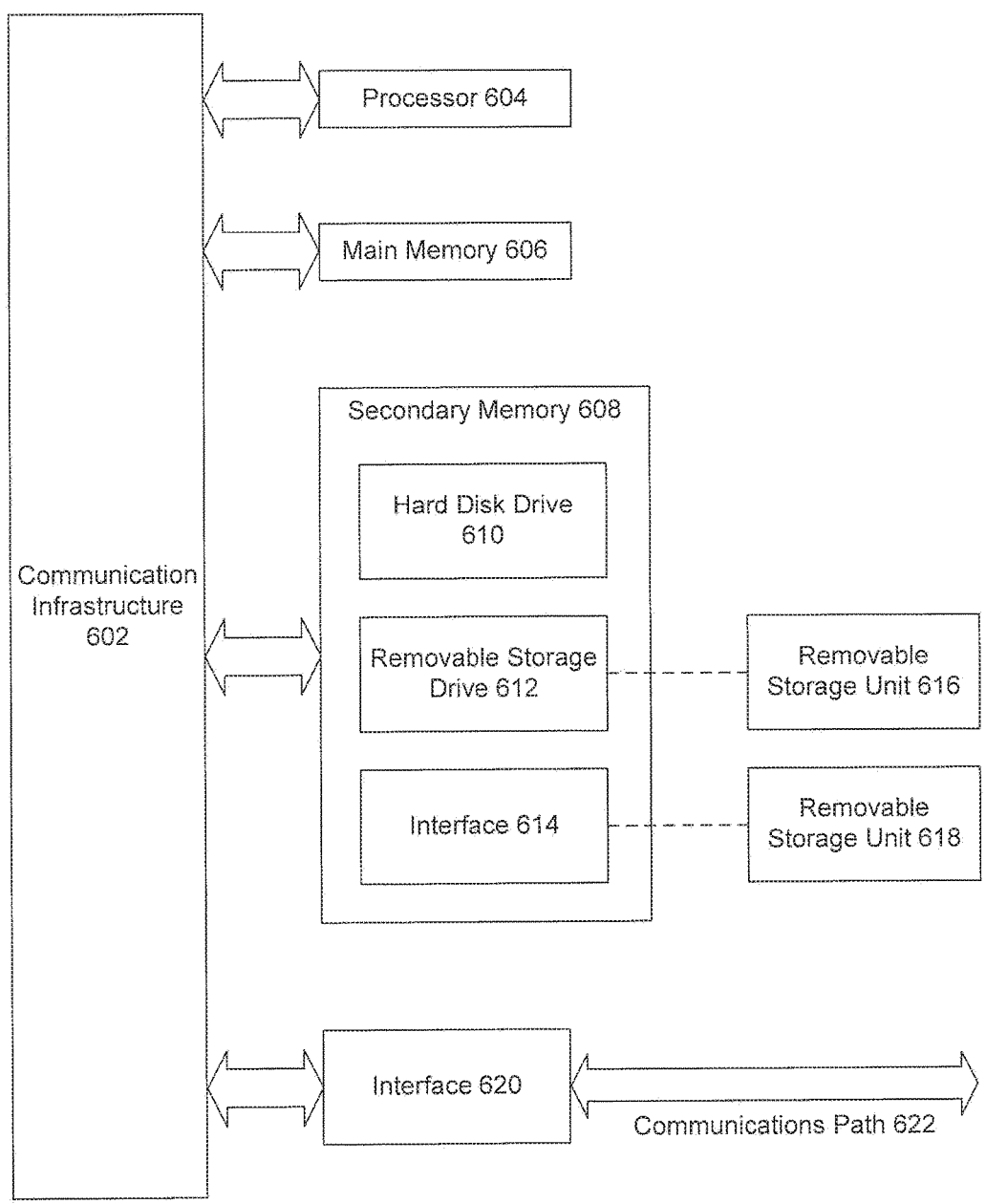
FIG. 6 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4-5 can be implemented in the environment of one or more computer systems or other processing systems. An example of such a computer system 600 is shown in FIG. 6. One or more of the modules depicted in the previous figures can be at least partially implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCM-CIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A system for providing product ordering and delivery services for an inmate in a correctional facility, the system comprising:
   an order processing subsystem that stores order information for each order of a plurality of orders for inmates in the correctional facility; and
   a delivery processing subsystem at the correctional facility comprising at least one database and one or more processors configured to:
      receive a request for a user to access the delivery processing subsystem and a scanning device;
      authenticate the user by verifying the request with user credentials stored in the at least one database;
      in response to authenticating the user, provide the user with access to the delivery processing subsystem and the scanning device;
      receive scanned data from the scanning device, wherein the scanning device comprises an RFID reader or a camera and the scanned data is generated by scanning an RFID tag on a package with the RFID reader or photographing a quick response (QR) code on a label affixed to the package with the camera;

retrieve, from the order processing subsystem, package data regarding the package for an inmate based on the scanned data received from the scanning device, wherein the package data comprises an identity of the inmate and the package is received at the correctional facility without any information discernable to a human so as to conceal the identity of the inmate and contents of the package by use of the RFID tag or QR code; and generate, based on the package data, a route in the correctional facility for delivery of the package to the inmate in the correctional facility, wherein the route does not include the identity of the inmate.

2. The system of claim 1, wherein the request for the user to access the delivery processing subsystem and the scanning device comprises at least one of a username, password, challenge question, challenge answer, or biometric data.

3. The system of claim 1, wherein the package data further comprises order information for the inmate and an indication of contents of the package.

4. The system of claim 3, wherein the package is delivered to the inmate in the correctional facility with the generated route after the contents of the package are verified with the package data.

5. A method for delivery processing of a package for an inmate in a correctional facility, the method comprising:
receiving, from a computing device, a request for a user in the correctional facility to access a delivery processing system and a scanning device;
verifying the request with user credentials stored in one or more databases;
providing the user with access to the delivery processing system and the scanning device in response to verifying the request for the user;
receiving encoded data from the scanning device, wherein the scanning device comprises an RFID reader and the encoded data is generated by scanning an RFID tag affixed to the package with the RFID reader;
decoding the encoded data to obtain package data regarding the package for the inmate, wherein the package data comprises an identity of the inmate and the package is received at the correctional facility without any information discernable to a human so as to conceal the identity of the inmate and contents of the package by use of the RFID tag; and
generating, based on the package data, a route in the correctional facility for delivery of the package to the inmate in the correctional facility, wherein the route does not include the identity of the inmate.

6. The method of claim 5, wherein the package data further includes order information for the inmate and an indication of contents of the package.

7. The method of claim 5, further comprising;
retrieving a location of the inmate in the correctional facility from the one or more databases based on the package data.

8. The method of claim 7, wherein the generated route comprises turn by turn instructions for navigating the user to the location of the inmate in the correctional facility.

9. The method of claim 7, wherein the location of the inmate includes a prison cell number and a prison cell location of the inmate in the correctional facility.

10. The method of claim 9, wherein the location of the inmate is included in the generated route.

11. The method of claim 9, wherein the location of the inmate is not included in the generated route.

12. A delivery processing system for processing a plurality of packages for inmates in a correctional facility, the system comprising:
a database;
a computing device of a user in the correctional facility;
a scanning device configured to scan tags affixed to each of the plurality of packages;
a delivery processing subsystem comprising one or more processors; and
an authentication subsystem configured to authenticate a user requesting to access the delivery processing subsystem and the scanning device, wherein the one or more processors of the delivery processing subsystem are configured to:
provide the computing device of the user with access to the delivery processing subsystem and the scanning device in response to authentication of the user;
receive scanned data from the scanning device, wherein the scanning device comprises a quick response (QR) code reader and the scanned data is generated by scanning a QR code affixed to a package;
retrieve package data regarding the package for an inmate from the database using the scanned data from the scanning device, wherein the package data comprises an identity of the inmate and the package is received at the correctional facility without any information discernable to a human so as to conceal the identity of the inmate and contents of the package by use of the QR code; and
based on the package data, generate a route in the correctional facility for delivery of the package to the inmate in the correctional facility, wherein the route does not include the identity of the inmate.

13. The delivery processing system of claim 12, further comprising:
an employee profile subsystem configured to store employee profiles for authorized individuals of the correctional facility, wherein the user is an employee or an authorized individual of the correctional facility, and
wherein the authentication subsystem is further configured to:
receive a request from the computing device of the user to access the delivery processing subsystem and the scanning device;
retrieve an employee profile of the user from the employee profile subsystem; and
authenticate the user by verifying user credentials provided in the request with user information in the employee profile of the user.

14. The delivery processing system of claim 12, wherein the computing device of the user is configured to:
receive the scanned data from the scanning device, wherein the scanned data includes encoded data; and
transmit the encoded data from the scanning device to the delivery processing subsystem.

15. The delivery processing system of claim 14, wherein the one or more processors of the delivery processing subsystem are further configured to:
decode the encoded data from the scanning device by running a decoding algorithm to obtain the package data for the inmate.

16. The delivery processing system of claim 12, wherein the one or more processors of the delivery processing subsystem are further configured to:

transmit the generated route to the computing device of the user in order for the user to deliver the package to the inmate in the correctional facility using the generated route.

* * * * *